United States Patent [19]

Sanuki et al.

[11] Patent Number: 4,547,340
[45] Date of Patent: Oct. 15, 1985

[54] AUTOMATIC EXTRACTOR

[75] Inventors: Sannosuke Sanuki, Hamuramachi; Hideyuki Morikawa, Akikawa, both of Japan

[73] Assignees: Kabushiki Kaisha Daini Seikosha; Sanuki Kogyo Kabushiki Kaisha, both of Tokyo, Japan

[21] Appl. No.: 515,366

[22] Filed: Jul. 19, 1983

[30] Foreign Application Priority Data

Jul. 26, 1982 [JP] Japan ................. 57-129057

[51] Int. Cl.⁴ ............................................. G01N 31/00
[52] U.S. Cl. ..................................... 422/116; 422/64; 422/258; 422/260
[58] Field of Search ............... 422/116, 209, 64, 270, 422/285, 258, 260, 72; 494/84

[56] References Cited

U.S. PATENT DOCUMENTS

| | | | |
|---|---|---|---|
| 3,882,716 | 5/1975 | Beiman | 422/72 |
| 4,090,848 | 5/1978 | Naono | 422/81 |
| 4,155,978 | 5/1979 | Naono et al. | 422/64 |
| 4,200,667 | 4/1980 | Suzuki | 422/64 |
| 4,244,694 | 1/1981 | Farina et al. | 422/72 |
| 4,345,843 | 8/1982 | Berglund et al. | 422/64 X |

FOREIGN PATENT DOCUMENTS 2337917 2/1975 Fed. Rep. of Germany ...... 422/270

Primary Examiner—Barry S. Richman
Assistant Examiner—William R. Johnson
Attorney, Agent, or Firm—Robert E. Burns; Emmanuel J. Lobato; Bruce L. Adams

[57] ABSTRACT

An automatic extractor apparatus has a rotatable turn table on which are supported a plurality of angularly spaced-apart treating vessels. The treating vessels are mounted around the periphery of the turn table and are supported by pivot pins such that when the turn table is in a non-rotation state, the treating vessels hang downwardly from the pivot pins, whereas when the turn table is rotationally driven at high speed, the heating vessels pivot about the pivot pins and are flung outwardly due to centrifugal force. A drive mechanism rotationally indexes the turn table to different stop positions, and a plurality of treating stations are disposed at the stop positions to treat the solution contained in the treating vessels and extract therefrom the desired substance. The turn table is used both as an indexing table for indexing the treating vessels to different stop positions and a centrifuging table to centrifuge the solutions in the treating vessels. The apparatus is run automatically in accordance with a predetermined program under the control of a computer.

14 Claims, 7 Drawing Figures

AUTOMATIC EXTRACTOR

BACKGROUND OF THE INVENTION

This invention relates to an automatic extractor apparatus for extracting a particular substance from a natural or synthetic solution in a laboratory or the like.

In extracting a certain kind of substance from a natural or synthetic solution, it has been a general and customary practice to mix the solution with an extraction solvent so as to dissolve the desired substance to be extracted in the extraction solvent, then subject the solution to a centrifuge so as to separate the extraction solvent from the solution, and then fractionate and dry the extraction solvent and thus obtain the desired extract.

Extraction steps such as described above have been carried out virtually manually in the past using various kinds of instruments and devices for the respective steps by, for example, mixing manually the extraction solvent, manually mounting a vessel storing the solution to a shaker, manually moving the vessel to the centrifuge after shaking, manually fractionating the extraction solvent after centrifugal separation, manually moving the extract to a dryer after fractionation, and so forth, including the linking steps between these manipulative steps.

Accordingly, an operator or operators must attend from the very beginning till the end of the sequence of operations and the extraction procedure requires a great deal of labor. Moreover, since most of the steps must be carried out manually, the work efficiency is extremely low.

To eliminate the problems with the prior art described above, the present invention is directed to an automatic extractor apparatus which can carry out automatically various operations and which comprises a turn table equipped with a high speed rotation driving mechanism and capable of stopping at desired work positions; a plurality of treating vessel supports for supporting treating vessels so as to enable the vessels to undergo tilting movement, the treating vessel supports being disposed in angularly spaced relation around the peripheral portion of the turn table with predetermined gaps between them; suction-discharge nozzles for effecting various treatments such as suction and discharge of a solution inside the treating vessels, charging of a reagent, suction of the solution after reaction, and so forth, that are disposed above the stop positions of the plurality of treating vessels of the turn table and are moved up and down by respective elevation means; a treating vessel shaker and a heating tank for storing the treating vessels, that are disposed above and below the stop position of the treating vessels and are moved up and down by elevation means; and compulsive exhaust means lowered toward the opening of the treating vessels stored in the heating tank by elevation means; wherein the rotation and indexing of the turn table, the elevation, suction and discharge of the various nozzles and the operation of the shaker, the heating tank and the compulsive exhaust means are carried out sequentially and automatically in accordance with a predetermined program.

BRIEF DESCRIPTION OF THE DRAWINGS

The accompanying drawings illustrate one embodiment of the present invention, wherein.

Figure 1:
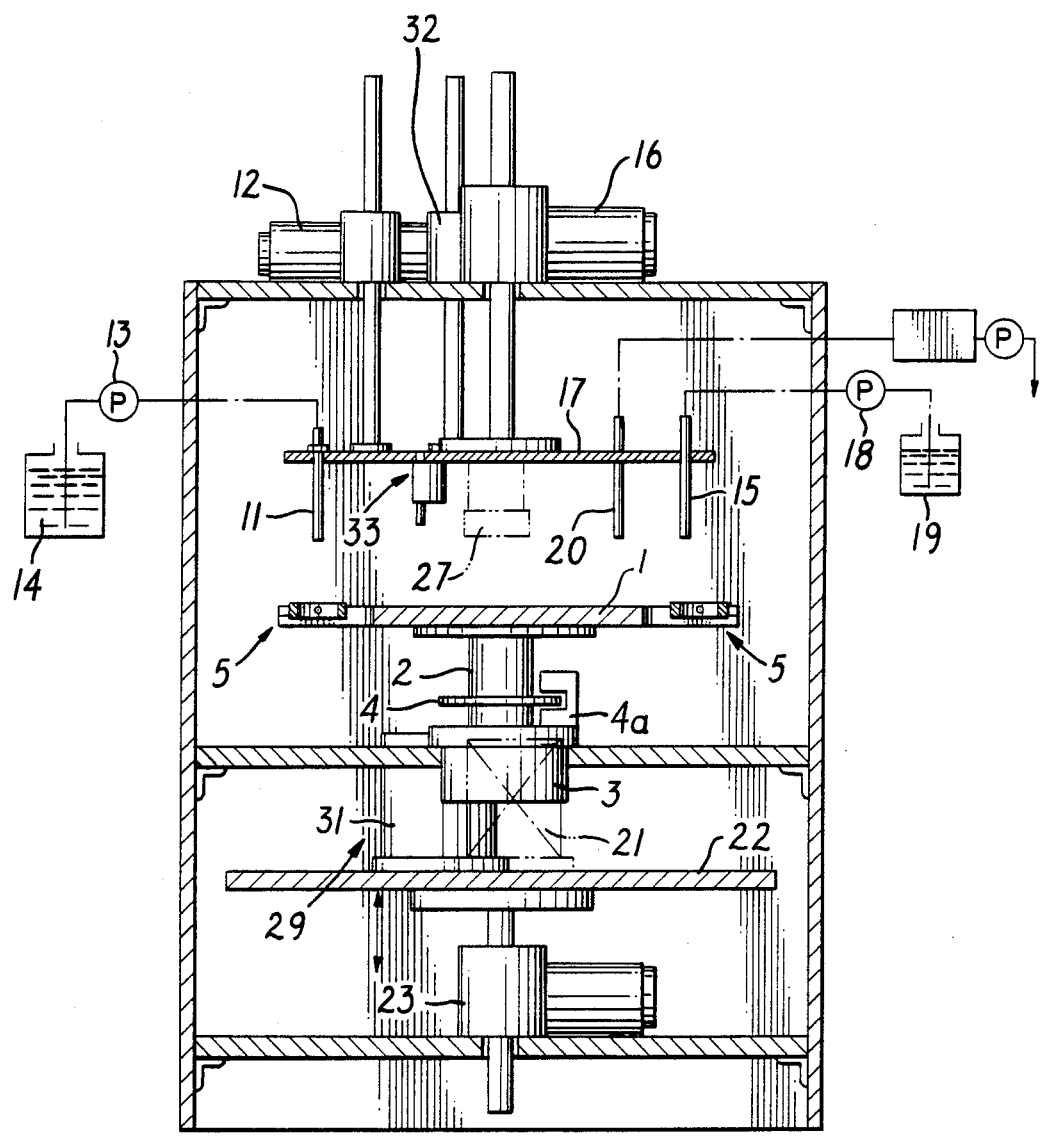
FIG. 1 is a longitudinal sectional view of the major parts of the apparatus.

Hereinafter, an embodiment of the present invention will be described with reference to the accompanying drawings.

In the drawings, reference numeral 1 represents centrifuged turn table. This turn table 1 is turnably supported by means of a shaft 2 to undergo both rotational indexing movement and high speed rotation by motor 3. A disc 4 for detecting the angle of rotation of the table 1 is fixed to the shaft. Through-holes of the disc 4 are detected by a sensor 4a so as to control the driving of the motor 3 and to rotationally index the turn table to desired stop positions.

Figure 2:
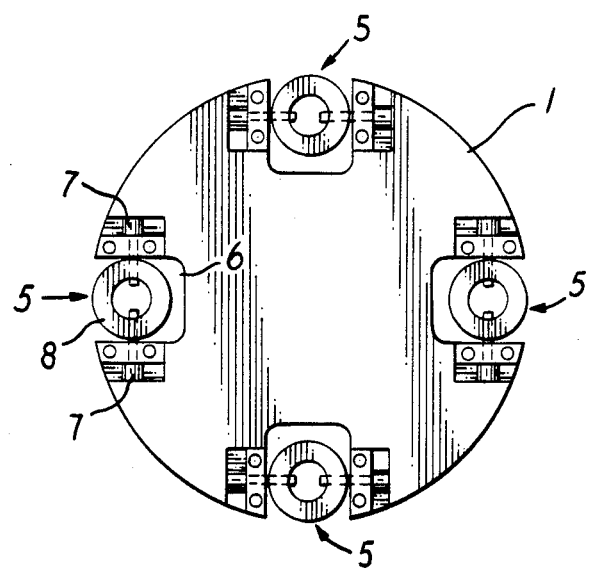
FIG. 2 is a plan view of the turn table.
Figure 3:
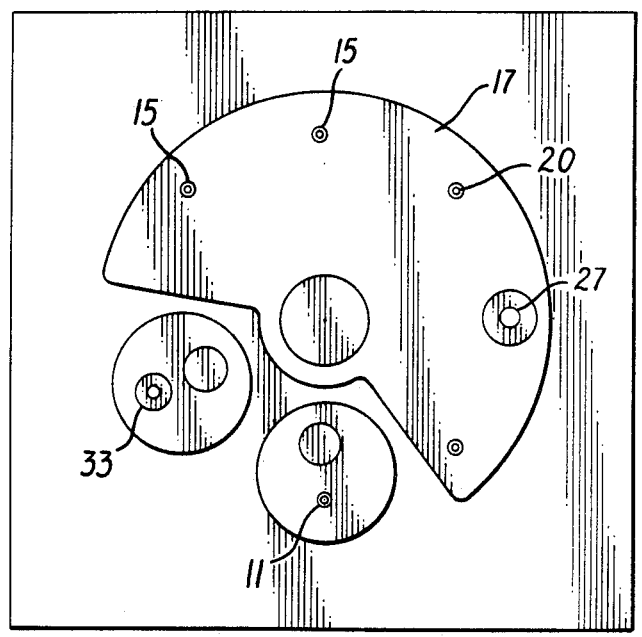
FIG. 3 is a bottom view of the support disc which is disposed vertically above the turn table.

A plurality of treating vessel supports 5 are disposed in an angularly spaced relation around the peripheral portion of the turn table 1 with predetermined gaps between them. As depicted in FIGS. 2 and 3, each treating vessel support 5 has a recess 6 which is defined by a radially-recessed peripheral portion of the turn table 1 in the radial inward direction, and a vessel support ring 8 turnably supported inside the recess 6 by a pair of horizontal pivot pins 7, 7. The end tips of the pins 7, 7 project in opposite directions towards the inner circumferential surface of the support ring 8. As shown in FIG. 2, each pair of pins 7,7 lie on a common straight line which extends perpendicular to a radial line of the turn table 2 which passes midway between the end tips of the pins.

Figure 4:
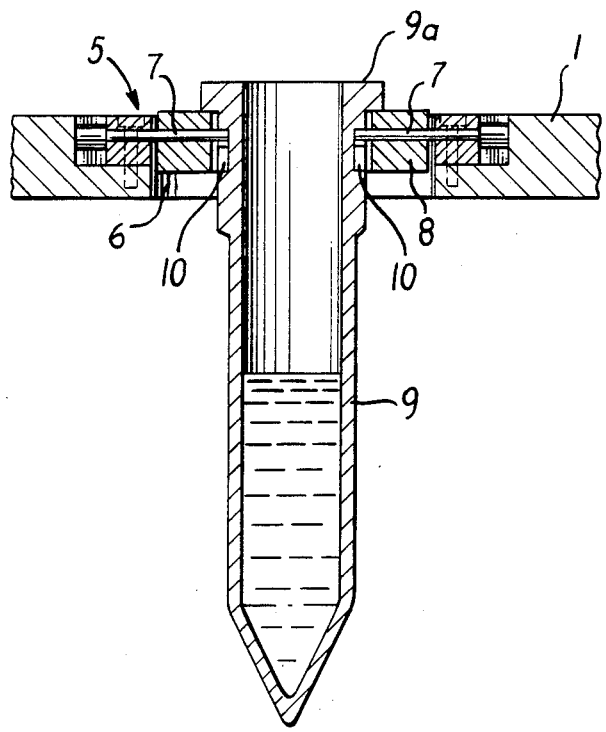
FIG. 4 is an enlarged sectional view of the shaker.
Figure 4:
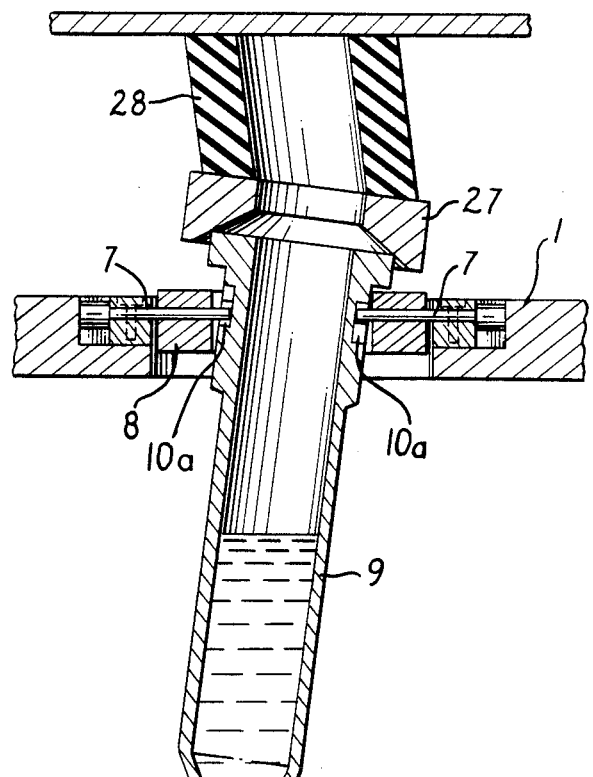
Figure 5:
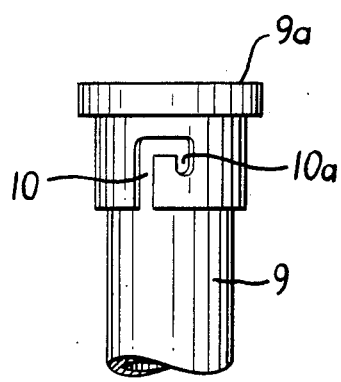
FIG. 5 is a partial side view of the treating vessel.
Figure 6:
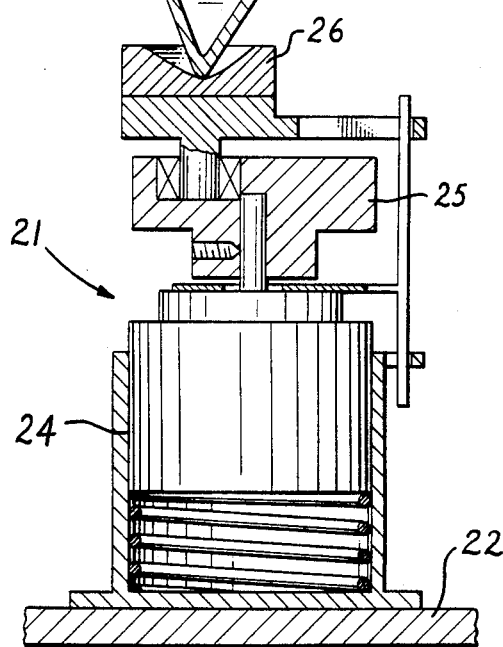
FIG. 6 is a longitudinal sectional view showing the shaker during use.
Figure 7:
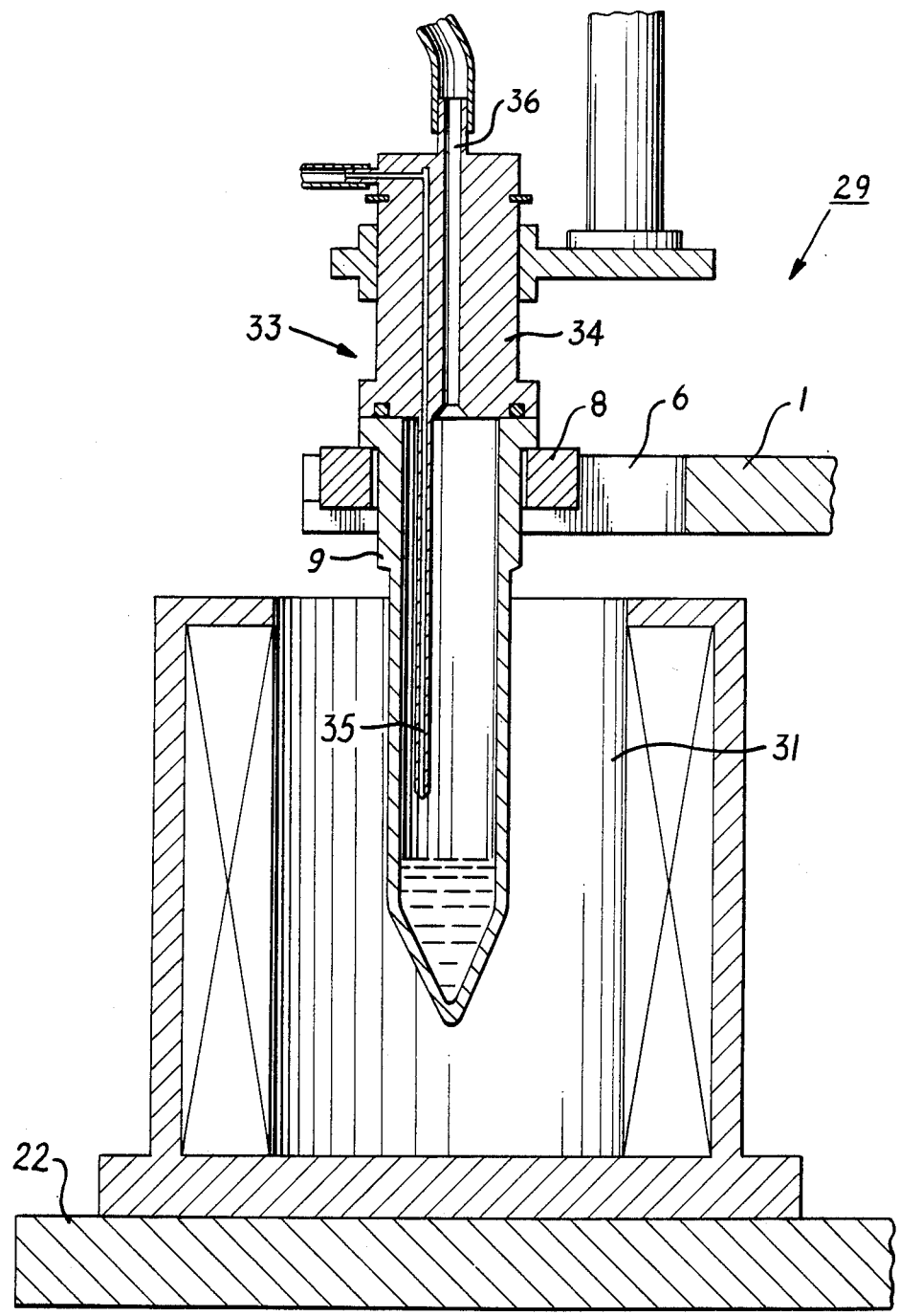
FIG. 7 is a longitudinal sectional view of the drying mechanism.

A treating vessel 9 is supported inside each vessel support ring as shown in FIGS. 4–6. A bayonet groove 10 (FIG. 5) is defined on the outer circumferential surface of the upper end portion at diametrically opposite parts of the vessel 9, and the projecting tips of the pins 7,7 are fitted into the grooves 10 so that the treating vessel 9 is locked after it is rotated. A vertical groove portion 10a is defined at the L-shaped deepest portion of each bayonet groove 10 and the pins 7 as well as the treating vessel 9 can move relatively up and down a distance corresponding to the vertical groove portion 10a.

A solution charging nozzle 11 is disposed above the turn table 1 in such a fashion that is aligns above the stop position of the respective treating vessel supports up and down by an elevator 12. The solution charging nozzle 11 communicates with a pump 13 through a flow passage and its tip is communicated with a solution tank 14.

Extraction solvent charging nozzles 15 are disposed so as to correspond to other stop positions of the turn table 1. Each extraction solvent charging nozzle 15 is fixed to a support disc 17 that is moved up and down by an elevator 16. Each extraction solvent charging nozzle 15 is further communicated with a pump 18 via a flow passage and its tip is communicated with an extraction solvent tank 19.

The support disc 17 is equipped with a suction-discharge nozzle 20 for fractionating the extraction solvent. The suction discharge nozzle 20 sucks the extraction solvent that dissolves the substance in the solution, and feeds it to another treating vessel 9.

A shaker 21, which is supported by a board 22, is fitted below the turn table 1. The board 22 is moved up and down by an elevator 23 disposed below the board 22.

The shaker 21 shakes the treating vessels 9 supported on the turn table 1 and mixes and stirs the solution with the extraction solvent. As shown in FIG. 6, the shaker 21 consists of a motor 24 for rotationally driving a crank 25 fitted to the shaft of the motor 24, and an oscillator 26 turnably fitted to the crank pin of the crank 25. The motor 24 is actuated while the treating vessels 9 are pushed downwardly by a push member 27 that is supported by the support disc 17 above the turn table 1. The push member 27 is fitted via a resilient member 28 made of rubber or the like.

A drying mechanism 29 is disposed vertically below the turn table 1 so as to correspond to the other stop positions of treating vessel supports 5 of the turn table 1.

The drying mechanism consists of a heating tank 31 that is moved up and down by the elevator 23 situated below the turn table 1, and compulsive exhaust means 33 that is moved up and down by an elevator 32 disposed above the turn table 1 so as to correspond to the heating tank 31. The compulsive exhaust means 33 consists of a plug 34 for closing the opening of the treating vessel 9, a jet nozzle 35 projecting downward from the plug 34 and an exhaust port 36 extending completely through the plug 34. An inert gas is blown through the jet nozzle 35 and the steam heated and vaporized by the heating tank 31 is compulsively discharged from the exhaust port 36 without scattering or leaking to the surrounding area.

In the apparatus of the invention described above, the parts are sequentially actuated to carry out the extraction treatment. The operation of the apparatus is controlled by an automatic control mechanism incorporating therein a microcomputer.

Next, the sequential operation of the apparatus will be described. First, the treating vessels 9 are supported by the respective treating vessel supports 5 of the turn table 1. Under this state, the turn table 1 is rotationally indexed and the treating vessels 9 of the treating vessel supports 5 are sequentially stopped below the solution charging nozzle 11. The nozzle 11 is then lowered so as to charge a predetermined quantity of solution into the treating vessels 9. The vessels 9 are then sequentially positioned below the extraction solvent charging nozzle 15 and a predetermined quantity of extraction solvent is charged by lowering the nozzle 15. After the extraction solvent is thus charged, the turn table 1 is again rotationally indexed and after one of the treating vessels 9 is transferred to the position of the shaker 21, the turn table 1 is stopped. The shaker 21 is then elevated and at the same time, the push member 27 is lowered so as to clamp the treating vessel 9 between the push member 27 and the oscillator 26. The motor 24 is rotated so as to shake the treating vessel 9 and to sufficiently mix and stir the extraction solvent with the solution.

Thereafter, the shaker 21 and the push member 27 are returned to the original positions and the turn table is rotationally driven as a unit at a high speed. Accordingly, the treating vessels 9 are flung outwardly in the radial direction of the turn table 1, pivoting on the pins 7, 7, due to the centrifugal force, and solution and the extraction solvent inside the vessels are centrifuged.

After separation is effected in the manner described above, each treating vessel 9 is sequentially positioned below the suction-exhaust nozzle 20 for fractionating the extraction solvent, and the nozzle 20 is then lowered so as to suck the extraction solvent as the supernatant. After suction, the nozzle is raised and the turn table 1 is rotationally indexed so that another empty treating vessel is positioned below the suction-discharge nozzle 20, followed then by the same procedures of lowering the suction-discharge nozzle and charging of the solution into the treating vessel 9.

After the extraction solvent is thus stored in the treating vessel 9, the vessel 9 is moved to the position of the drying mechanism 29 by rotationally indexing the turn table 1. The heating tank 31 is raised and at the same time, the compulsive exhaust means is lowered so as to compulsively discharge the vapor and to heat and dry the solvent to obtain the desired extract.

Needless to say, various heretofore known drying mechanisms and shakers can be used in the present invention besides those described in the foregoing embodiment.

The automatic extractor apparatus in accordance with the present invention has the construction described above, in which the turn table can be rotated at a high speed and can be stopped at a suitable work position, the treating vessels are supported by the turn table so as to be able to rock in the radial direction, the solution and extraction solvent nozzles are disposed in the vertical direction of the turn table, and the shaker, the heating tank and the compulsive discharge means are disposed so that all the constituent members of the apparatus can be automatically actuated in accordance with a predetermined program. Accordingly, the substance can be automatically extracted from the solution with hardly any manual operations. Hence, the present invention can remarkably eliminate the manual work and labor and improve the efficiency to a marked extent.

What is claimed is:

1. An automatic extractor apparatus comprising: a centrifugal turntable equipped with a high speed rotation driving mechanism and capable of stopping at a plurality of predetermined, desired rotary stop positions; a plurality of treating vessel supports for supporting treating vessels in such a manner so as to permit the treating vessels to undergo a rocking motion, the supports being disposed in angularly spaced relation around the peripheral portion of said turntable; a plurality of suction-discharge nozzles for effecting various treatment steps such as suction and discharge of a solution inside said treating vessels, charging of a reagent, and suction of the solution after reaction, the nozzles being disposed above the turntable at predetermined stop positions thereof; shaking means for shaking the treating vessels and a heating tank for storing the treating vessels, the shaking means and heating tank being disposed at predetermined stop positions of the turntable; and means for automatically and sequentially carrying out the rotation and stopping of rotation of said turntable, the operation of the suction-discharge nozzles, the operation of said shaking means, the operation of said heating tank and the centrifuging of the treating vessels in accordance with a predetermined program.

2. Apparatus for extracting a substance from a solution containing the substance, comprising: a rotatable turntable; a plurality of treating vessel supports disposed in angularly spaced-apart relation about a peripheral portion of the turntable, each treating vessel support having means for pivotally supporting a treating vessel such that when the turntable is not being rotated the treating vessel hangs downwardly from its pivotal support and when the turntable is rotated at high speed the treating vessel pivots about its pivotal support and is flung outwardly due to centrifugal force; drive means for rotationally driving the turntable to selectively rotationally index the turntable to different stop positions and to rotationally drive the turntable at high speed; and a plurality of treating means disposed at different turntable stop positions for performing treating operations on a solution contained in the treating vessels to effect the extraction of a substance contained in the solution.

3. Apparatus according to claim 2; wherein the plurality of treating means includes a plurality of nozzles disposed vertically above the turntable at predetermined stop positions thereof.

4. Apparatus according to claim 3; including means for vertically moving the nozzles into and out of registry with the treating vessels when the treating vessels are rotationally indexed by the turntable to the predetermined stop positions.

5. Apparatus according to claim 3; wherein the plurality of treating means further includes shaking means disposed vertically below the turntable at one of the predetermined stop positions thereof for shaking the treating vessel which is rotationally indexed to the one predetermined stop position.

6. Apparatus according to claim 5; wherein the plurality of treating means further includes heating means disposed vertically below the turntable at one of the predetermined stop positions thereof for heating the treating vessel which is vertically indexed to the one predetermined stop position.

7. Apparatus according to claim 2; wherein each treating vessel support comprises means defining a recess in the peripheral portion of the turntable, and a pair of pivot pins secured to the turntable and having ends which project in opposite directions into the recess, the pin ends being pivotally connected to opposite parts of a treating vessel to thereby pivotally support the treating vessel on the turntable within the recess.

8. Apparatus according to claim 7; wherein the pair of pivot pins lie on a common straight line which extends perpendicular to a radial line of the turntable which passes midway between the projecting ends of the pivot pins.

9. Apparatus according to claim 7; wherein each treating vessel has a pair of openings in opposite parts thereof in which are pivotally received the projecting ends of the pair of pivot pins.

10. Apparatus according to claim 9; wherein the treating vessel openings comprise bayonet grooves.

11. Apparatus according to claim 7; wherein the plurality of treating means include a plurality of nozzles disposed vertically above the turntable at a plurality of predetermined stop positions thereof.

12. Apparatus according to claim 11; including means for vertically moving the nozzles into and out of registry with the treating vessels when the treating vessels are rotationally indexed by the turntable to the said predetermined stop positions.

13. Apparatus according to claim 11; wherein the plurality of treating means further includes shaking means disposed vertically below the turntable at one of the predetermined stop positions thereof for shaking the treating vessel which is rotationally indexed to the one predetermined stop position.

14. Apparatus according to claim 13; wherein the plurality of treating means further includes heating means disposed vertically below the turntable at one of the predetermined stop positions thereof for heating the treating vessel which is rotationally indexed to the one predetermined stop position.

* * * * *